United States Patent [19]

Carpena et al.

[11] Patent Number: 5,771,472
[45] Date of Patent: Jun. 23, 1998

[54] PROCESS FOR THE CONDITIONING OF RADIOACTIVE WASTE USING PHOSPHOSILICATED APATITES AS THE CONFINEMENT MATRIX

[75] Inventors: Joëlle Carpena, Jouques; Jean-Louis Lacout, Toulouse, both of France

[73] Assignee: Commissariat a l'Energie Atomique

[21] Appl. No.: 591,169

[22] PCT Filed: Jul. 12, 1994

[86] PCT No.: PCT/US94/00873

§ 371 Date: Nov. 16, 1995

§ 102(e) Date: Nov. 16, 1995

[87] PCT Pub. No.: WO95/02886

PCT Pub. Date: Jan. 26, 1995

[51] Int. Cl.$^6$ ........................................... G21F 9/00
[52] U.S. Cl. ................... 588/2; 588/14; 588/15; 588/16; 252/625; 976/DIG. 385; 423/304; 423/325
[58] Field of Search ................... 588/2, 14–16; 423/304, 325; 252/625; 976/DIG. 385

[56] References Cited

U.S. PATENT DOCUMENTS

| 3,959,172 | 5/1976 | Brownell et al. . |
| 3,960,085 | 6/1976 | Abernathy et al. . |
| 3,994,823 | 11/1976 | Ainger et al. . |
| 4,026,213 | 5/1977 | Kempton . |
| 4,028,265 | 6/1977 | Barney et al. . |
| 4,442,028 | 4/1984 | Wolf et al. . |
| 5,182,418 | 1/1993 | Talley . |

FOREIGN PATENT DOCUMENTS 2 704 052   10/1994   France .

OTHER PUBLICATIONS

Weber, "Radiation Damage in a Rare–Earth Silicate With the Apatite Structure," *Journal of the American Ceramic Society*–vol. 65(11), pp. 544–548 (1982).

Harker, et al., "Polyphase Ceramic for Consolidating Nuclear Waste Compositions with High Zr–Cd–Na Content," *Journal of the American Ceramic Society*–vol. 73(7), pp. 1901–1906 (1990).

Alleluia, et al., "Silicates of Tervalent Transuranium Elements," *Revue de Chimie Minerale*–vol. 20(4–5), pp. 441–448 (1983).

Fedorov, et al., "Synthesis and Investigation of Silicate-–Fluorapatites with the Composition $M_4Ln_6[SiO_4]_6F_2$, Where M is a Ca or Sr, Ln is Nd, Y, or Yb," *Inorganic Materials*–vol. 9(3), pp. 652–654 (1973).

Krajewski, et al. "Mineral–Contributed Anion Effects on the Retention of Trivalent Actinides in the Environment," *25th Annual Meeting of the American Nuclear Society, USA*–pp. 168–169, (1979).

Givan, et al., "Syntheses and Characterization of Uranium Containing Apatites," *Polyhedron*–vol. 1(4), pp. 343–348 (1982).

*Primary Examiner*—Ngoclan Mai
*Attorney, Agent, or Firm*—Burns, Doane, Swecker & Mathis, LLP

[57] ABSTRACT

The invention relates to a process for the conditioning of radioactive waste using silicated apatites as the confinement matrix.

This process consists of incorporating the waste (1) into a phosphosilicated apatite-based confinement matrix (3) e.g. complying with the formula:

$$M_tCa_xLn_yA_z(PO_4)_u(SiO_4)_{6-u}X \quad (I)$$

in which M is an alkali metal, Ln a rare earth, A an actinide, X is $S^{2-}$, $2F^-$, $2Cl^-$, $2Br^-$, $2I^-$ or $2OH^-$ and u is between 0 and 6.

14 Claims, 1 Drawing Sheet

PROCESS FOR THE CONDITIONING OF RADIOACTIVE WASTE USING PHOSPHOSILICATED APATITES AS THE CONFINEMENT MATRIX

The present invention relates to the conditioning of radioactive waste and in particular long life radioactive waste such as actinides.

In irradiated nuclear fuel reprocessing installations, at the end of processing, a few long life actinide elements and certain lanthanides are left at the end of the treatment and which must be conditioned with a view to long-term storage in highly resistant matrixes.

The materials usable as a matrix must have chemical stability, radiation stability and very high temperature stability characteristics in order to isolate the radioactive elements from the environment and keep them in this isolated state for very long periods, due to their radioactive period.

At present, the matrix used for this conditioning iS glass, but new materials are continuously being sought which have even better characteristics for such conditioning purposes.

The present invention relates to a process for the conditioning of radioactive waste using as the confinement matrix a material having properties particularly appropriate for long-term storage.

According to the invention, the radioactive waste conditioning process consists of incorporating said waste into a confinement matrix based on phosphosilicated apatite.

The use of phosphosilicated apatite is very interesting, because apatites have the following remarkable properties.

These structures are very chemically and thermally stable in the natural medium. There are also natural silicated apatites containing actinides for hundreds of millions of years.

Apatites have a very limited solubility in water. In addition, their solubility decreases when the temperature increases, which is a positive point for the conditioning of the actinides, because their high activity involves an increase in the temperature of the matrix which will contain same.

Apatite structures are able to resist radioactivity, because the radiation damage which they suffer is unstable at a temperature exceeding 60° C. Thus, apatite has the property of being restructured at temperatures exceeding 60° C.

Apatite structures have the very interesting property of being able to integrate into their structure numerous metallic elements and in particular actinides and lanthanides.

Thus, natural apatites can be represented in the form of the following general formula:

$$Ca_{10}(PO_4)_6F_2$$

which corresponds to the structure of fluoroapatite. However, in this structure, numerous substitutions can be made and in particular the $Ca_2^+$ cations can be replaced by various metallic elements such as lanthanides, actinides and alkali metals, the $PO_4^{3-}$ ions can be substituted by other anions such as $SiO_4^{4-}$ and the $F^-$ anions can be substituted by the anions $S^{2-}$, $Cl^-$, $Br^-$, $I^-$ or $OH^-$.

According to the invention, the phosphosilicated apatite used complying with the formula:

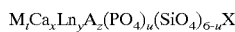

$$M_tCa_xLn_yA_z(PO_4)_u(SiO_4)_{6-u}X$$

in which

M is at least one alkali metal cation,

Ln represents at least one cation chosen from among yttrium and lanthanides,

A represents at least one cation chosen from among actinides,

X represents $S^{2-}$, $2F^-$, $2Cl^-$, $2OH^-$, $2Br^-$ or $2I^-$ and t, u, x, y and z are such that $0 \leq t \leq 3$ $0 < u < 6$ $0 < x < 10$ $0 \leq y \leq 10$ $0 \leq z \leq 7$ $y+z>0$ and that the total number of positive charges supplied by the cations M, Ca, Ln and A is equal to (26−u).

In this formula, the total number of negative charges is supplied by the anions $PO_4^{3-}$, $SiO_4^{4-}$ and $X^{2-}$. These charges are balanced by added cations among which the lanthanides and actinides can be in different states, e.g. divalent, trivalent or tetravalent states in the case of lanthanides and trivalent or tetravalent states in the case of actinides.

In order that said charge balance is respected, the quantities t, x, y and z are chosen as a function of the quantity u of anion $PO_4^{3-}$ and the valency state of the lanthanides and/or actinides present in order to obtain neutrality. Therefore these quantities may or mav not be integers.

The alkali metals used in this apatite can e.g. be $Na^+$, $K^+$ and $Cs^+$. The lanthanides can be of a random type and the actinides can e.g. be Np, Pu, Am, Cm, etc.

In the phosphosilicated apatites used in the invention, the choice of the $PO_4$:$SiO_4$ ratio is an important parameter, because it makes it possible to obtain a good compromise between the resistance to radiation damage and the resistance to leaching.

As an example of a phosphosilicated apatite usable in the invention, reference is made to fluoroapatites complying with the formula:

$$Ca_{10-y}Ln_y(PO_4)_{6-y}(SiO_4)_yF_2 \qquad (II)$$

in which y is such that:

$0<y<6.$

According to the invention, the phosphosilicated apatite matrix can be formed by non-active elements and can be used solely as an enveloping matrix for a radioactive waste, or it can incorporate in its chemical structure the active elements of the waste such as lanthanides and actinides.

In the latter case, the phosphosilicated apatite will comply with the formula:

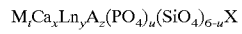

$$M_tCa_xLn_yA_z(PO_4)_u(SiO_4)_{6-u}X$$

in which at least part of the Ln and A are lanthanides and actinides to be conditioned, and M, x, y, t and u have the meanings given hereinbefore.

When the radioactive elements are directly incorporated into the structure of the apatite, it is also possible to place around said apatite containing the lanthanides and/or actinides to be conditioned, at least one non-active phosphosilicated apatite layer and optionally other silicated or non-silicated apatite layers having a different composition so as to constitute appropriate successive barriers between the active waste and the environment.

In the same way, it is possible to have one or more silicated or non-silicated apatite layers of different composition around the waste surrounded by a first nonactive phosphosilicated apatite layer.

In both cases, the innermost layers are preferably chosen so as to withstand irradiation waste and the outermost layers can be chosen so as to withstand the aggressive action of the external medium. It is also possible to use for one or more layers the composition of the fluoroapatite $Ca_{10}(PO_4)_6F_2$, which is particularly resistant.

In addition, the layers are chosen so as to improve the overall mechanical properties.

The phosphosilicated apatites of formula (I) used in the invention can be prepared from powder of constituents in the form of oxide, phosphate, carbonate, fluoride, halide, sulphide, hydroxide or silicate.

The invention also relates to a process for the preparation of silicated apatites of formula:

$$M_tCa_xLn_yA_z(PO_4)_u(SiO_4)_{6-u}X \quad (I)$$

in which M, Ln, A, t, x, y, z and u have the meanings given hereinbefore and X represents $2F^-$ and which comprises the following stages:

a) preparing a mixture of powders containing at least one phosphate chosen from among calcium pyrophosphate, phosphates of lanthanides and phosphates of actinides, when u differs from 0, calcium fluoride, calcium carbonate, at least one compound chosen from among $SiO_2$, $CaSiO_3$ and $M_2SiO_3$ and optionally one or more oxides chosen from among oxides of rare earths and oxides of actinides, in proportions such that they correspond to the obtaining of the desired apatite of formula (I), b) thermally treating the mixture in order to decompose the calcium carbonate and eliminate the carbon dioxide gas and c) calcining the thermally treated mixture at a temperature of 800° to 1500° C. for an appropriate time for forming the silicated apatite of formula (I).

In the first stage of the process, preparation takes place of the mixture by crushing powders to a grain size preferably below 50 $\mu$m.

The $CaCO_3$ thermal decomposition treatment can then be performed under atmospheric pressure and a temperature of 700° to 1200° C., e.g. approximately 900°±10° C., for approximately 1 hour.

The pressurized heat treatment can also be carried out at lower temperatures, e.g. at 650° to 1000° C. and under pressures of 600 to 2000 mPa.

For the final calcining, the calcining time is chosen as a function of the temperature used and can vary between 2h for high temperatures of e.g. 1300° to 1400° C. and under atmospheric pressure to approximately 20h for lower temperatures, e.g. 1100° to 1200° C.

Following calcination, the mixture is preferably crushed again to a grain size below 50 $\mu$m and the calcination and grinding or crushing stages are optionally repeated one or more times until a homogeneous apatite compound is obtained.

Calcination can also be carried out under pressure, e.g. at 1000 to 3000 mPa for times chosen as a function of the temperature used, the latter being generally lower, e.g. 800° to 1100° C. than in the case of calcinations carried out at atmospheric pressure.

Other features and advantages of the invention can be more clearly gathered from the following illustrative and non-limitative description with reference to FIGS. 1 to 5 illustrating the radioactive waste conditioning blocks obtained according to the invention.

A description will now be given of several examples for obtaining phosphosilicated apatite-based matrixes according to the invention.

I. Preparation of phosphosilicated apatite containing rare earths and actinides

For this preparation use is made of calcium carbonate $CaCO_3$, calcium pyrophosphate $Ca_2P_2O_7$, silica $SiO_2$, calcium fluoride $CaF_2$, lanthanum oxide $Ln_2O_3$ and/or lanthanum phosphate $LnPO_4$ and an oxide and/or phosphate of actinide. This preparation corresponds to the following reaction diagram in the case of the apatite of formula (I) with $X=2F^-$, t=0, z=0, x=10-y and u=6-y, namely the apatite of formula:

$$Ca_{10-y}Ln_y(PO_4)_{6-y}(SiO_4)_yF_2 \quad (II)$$

$$aCaCO_3+bLa_2O_3+cCa_2P_2O_7+dSiO_2+eCaF_2+fLaPO_4 \rightarrow Ca_{10-y}Ln_y(PO_4)_{6-y}(SiO_4)_yF_2 \quad (II)$$

in which a, b, c, d, e and f are molar quantities of the different constituents.

In order to obtain the desired apatite, it is therefore necessary to satisfy the following relations:

y=f+2b y=d and 10-y=a+2c+e 6-y=f+c/2.

As an example, Table 1 gives the value of the coefficients a, b, c, d, e, and f, which can be chosen as a function of the value of y and the product to be obtained.

The starting products used for this preparation are commercially available or natural products. However, the pyrophosphate $Ca_2P_2O_7$ can be prepared by calcining in air, e.g. at a temperature of 700°±10° C. for 1h dihydrated dicalcium phosphate $Ca(HPO_4)$, $2H_2O$, which is commercially available in large quantities.

If a lanthanide phosphate is used it is commercially obtainable. However, as it is relatively expensive, it is possible to use a less onerous solution in the case where y=2 or 3, by replacing the commercial phosphate by a natural phosphate such as monazite or xenotime. The general formula of monazites and xenotimes is $LnPO_4$. For monazites, Ln is largely constituted by cerium and cerium earths. For xenotimes, Ln is constituted by yttrium and yttrium earths. Moreover, silica is often associated with natural ores, which is not a problemr because silica is necessary for producing the apatite according to the invention. Thus, on the basis of the chemical analysis of the natural ore, it is possible to balance a reaction so as to obtain a silicated apatite at a more reasonable price. At the end of the reaction, monazite or xenotime which has not reacted is left, but this is not prejudicial because these compounds are particularly stable and can be included in the confinement matrix.

The following examples 1 to 4 illustrate the preparation of lanthanum-based phosphosilicated apatites according to the invention.

EXAMPLE 1

Preparation of $Ca_6La_2(PO_4)_4(SiO_4)_2F_2$.

In order to obtain this apatite, use is made of the quantities of $CaCO_3$, $La_2O_3$, $Ca_2P_2O_7$, $SiO_2$ and $CaF_2$ given in table 2. The $CaF_2$ quantity represents a 10% excess compared with the stoichiometric quantity in order to compensate the volatilization of $CaF_2$ during calcination and increase the reaction kinetics, i.e. bring about a total reaction.

For this preparation, the products are mixed and carefully crushed to a grain size below 50 µm and intimately mixed. The mixture obtained is then raised to 900°±10° C. for 1h in order to decompose the calcium carbonate and thus eliminate the $CO_2$. The mixture is then raised to a temperature of 1300°±10° C. in a furnace or kiln at atmospheric pressure. It is calcined at said temperature for 2h and is then crushed to a grain size below 50 µm. It is then successively calcined three times in accordance with the same cycle performing a crushing operation between each calcination.

This gives 12.04 g of apatite of formula:

$Ca_8La_2(PO_4)_4(SiO_4)_2F_2$.

The same result is obtained by carrying out the calcination in a single stage at a temperature of 1000°±10° C. under a pressure of 6000±500 mPa (60±5 Kbar) for about 2 hours.

EXAMPLES 2 AND 3

These examples follow the same operating procedure as in example 1 for preparing the products of table 2 using the starting product quantities mentioned therein and which gives lanthanum-based apatites.

EXAMPLE 4

In this example the same apatite as in example 1 is prepared, but use is made of lanthanum phosphate instead of lanthanum oxide and with the molar quantities of the starting products illustrated in line 1 of table 1.

In this case the same operating procedure is followed, but the starting product quantities are indicated below:

$CaCO_3$: 5.00 g
$LaPO_4$: 4.68±0.01 g
$Ca_2P_2O_7$: 2.54 g
$SiO_2$: 1.20 g
$CaF_2$: 0.86 g

As in example 1, there is an approximately 10% $CaF_2$ excess compared with the stoichiometric quantity. Carrying out the mixing of the starting products and the thermal treatment and calcination under the same conditions as in example 1, 12 g of lanthanum-based apatite are obtained.

II. Preparation of apatites from phosphates of lanthanides and/or actinides and calcium silicate.

The use of calcium silicate $CaSiO_3$ can be of great interest, because it is obtained in large quantities in the cement industry and also exists in nature under the name wollastonite $Ca_3(sio_3)_3$. The use of calcium silicate as the calcium source is consequently of interest because it is a natural product and will therefore lower the cost of the final apatite. Therefore in each preparation the calcium carbonate and silica can be partly or totally replaced by calcium silicate.

Thus, in order to obtain a silicated apatite of formula:

$Ca_8La_2(PO_4)_4(SiO_4)_2F_2$ it is possible to use the following starting products:
3 mole of $CaCO_3$,
2 mole of $LaPO_4$,
2 mole of $CaSiO_3$,
1 mole of $CaF_2$,
1 mole of $Ca_2P_2O_7$.
Example 5 illustrates the preparation of this product.

EXAMPLE 5

Preparation of the apatite $Ca_8La_2(PO_4)_4(SiO_4)_2F_2$

For this preparation, use is made of the following products:
$LaPO_4$: 4.68±0.01 g
$CaCO_3$: 3.00±0.01 g
$CaSiO_3$: 2.32±0.01 g
$CaF_2$: 0.86±0.01 g
$Ca_2P_2O_7$: 2.54±0.01 g The $CaF_2$ quantity represents a 10% excess compared with the stoichiometric quantity.

For preparing said apatite the same operating procedure as in example 1 is followed and the mixing, $CO_2$ elimination and calcination are performed under the same conditions.

This leads to 12 g of lanthanum-based silicated apatite having the formula given hereinbefore.

III. Preparation of phosphosilicated adatite containing lanthanides and/or actinides and sodium.

For introducing sodium into the apatite, to the mixture is added sodium metasilicate $Na_2SiO_3$ in a controlled quantity and which also serves as a flux.

This sodium addition is of interest because it makes it possible to increase the quantities of rare earths and actinides in the material favouring the substitution:

$2Ca^{2+} \rightarrow Na^+ + Ln^{3+}$
$2Ca^{2+} \rightarrow Na^+ A^{3+}$.

Moreover, due to the fact that the sodium metasilicate serves as a flux, there is a reactive sintering, which is more interesting.

The sodium metasilicate supply is calculated so as to correspond to the balancing of the charges and permits a practical production of the apatite.

The following example illustrates the preparation of an apatite of this type.

EXAMPLE 6

Preparation of the apatite of formula $Ca_4NaLa_5(PO_4)_2(SiO_4)_4F_2$

For this preparation the following products are used:
2.5 mole of $La_2O_3$,
3.5 mole of $SiO_2$,
0.5 mole of $Na_2SiO_3$,
1 mole of $CaCO_3$,
1 mole of $CaF_2$,
1 mole of $Ca_2P_2O_7$ As hereinbefore, use is made of a 10% excess $CaF_2$ quantity compared with the stoichiometric quantity in order to compensate for the volatilization during calcination. The operating procedure is as in example 1 for preparing a mixture of powders, raising same to 900°±10° C. for 1h in order to eliminate the $CO_2$, carrying out calcination in a kiln at atmospheric pressure and a temperature of 1350°±10° C. for 2h and carrying out several calcining-crushing cycles.

In order to carry out this preparation, it is also possible to use the following product quantities:

LaPO$_4$:2 mole
SiO$_2$:3.5 mole
Na$_2$SiO$_3$:0.5 mole
La$_2$O$_3$:1.5 mole
CaCO$_3$:3 mole
CaF$_2$:1 mole
or use calcium silicate in place of CaCO$_3$, i.e. based on the following products:
LaPO$_4$:2 mole
SiO$_2$:0.5 mole
Na$_2$SiO$_3$:0.5 mole
La$_2$O$_3$:1.5 mole
CaSiO$_3$:3 mole
CaF$_2$:1 mole In the latter case, there is no need to carry out the heat treatment at 900°±10° C. in order to decompose the CaCO$_3$ and eliminate the CO$_2$.

The phosphosilicated apatites according to the invention can be used in pulverulent form, in the form of granules or in the form of dense ceramics.

The pulverulent form is obtained directly by calcination. The granules can be prepared by conventional processes using calcined powder which is mixed with a liquid or a binder solution and other additives, granulation procedures being e.g. described in the introduction to the principles of ceramic processing by James S. Reed, John Wiley & Sons, Copyright 1988, pp. 313–325.

In order to prepare the product in the form of dense ceramics, a powder of the product or the granules previously obtained undergo sintering. This sintering can in particular be carried out by hot compression.

BRIEF DESCRIPTION OF THE DRAWINGS

The phosphosilicated apatites can be used as a confinement material for radioactive waste in a number of ways, as can be seen hereinafter with respect to FIGS. 1 to 5.

The block can be prepared by a process consisting of depositing in the bottom of a container a layer of powder or granules of apatite, then including the radioactive waste and finishing the filling of the container with powder or granules of apatite, following the subjecting thereof to hot isostatic compression.

Figure 1:
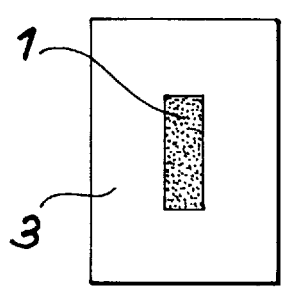
FIG. 1 shows a block obtained according to the invention. This block comprises radioactive waste 1 enveloped in a phosphosilicated apatite-based matrix 3. The radioactive waste can be constituted by high activity and in particular long-life waste, such as the waste resulting from the evaporation of high activity effluents.
Figure 2:
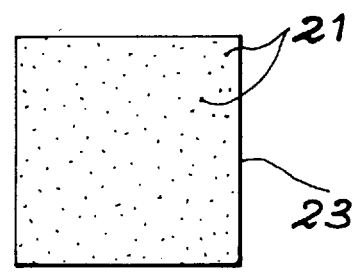

FIG. 2 shows another use procedure for the apatite according to the invention. In this case, the lanthanide and/or actinide radioactive elements 21 are directly included in the chemical structure of the phosphosilicated apatite 23 of formula (I) and they are therefore in solid solution in the actual material, i.e. in the phosphosilicated apatite.

Figure 3:
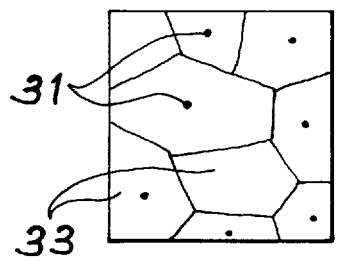

FIG. 3 shows another method for introducing the radioactive elements into the confinement matrix. In this case, the radioactive elements 31 are incorporated in the form of microinclusions into the phosphosilicated apatite crystals 33. This can be obtained by placing the radioactive waste in the matrix and recrystallizing at a pressure of 2000 to 4000 mPa (20 to 40 Kbar) and at a temperature of 1000° to 1100° C. or 1100° to 1500° C.

Figure 4:
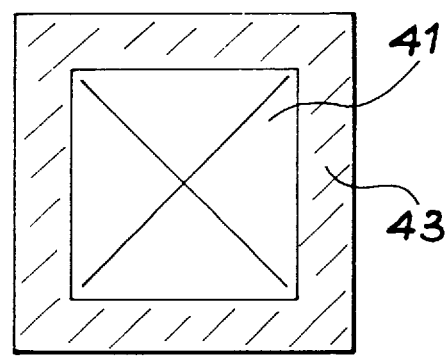

FIG. 4 shows a conditioning block of radioactive waste obtained by firstly placing the radioactive waste in the form of a block 41 in accordance with FIGS. 2 and 3, i.e. by including the radioactive elements in the chemical structure of the phosphosilicated apatite, namely by incorporating them in the form of microinclusions in the phosphosilicated apatite crystals and then surrounding the block with an outer layer 43 of phosphosilicated apatite not containing radioactive elements.

Figure 5:
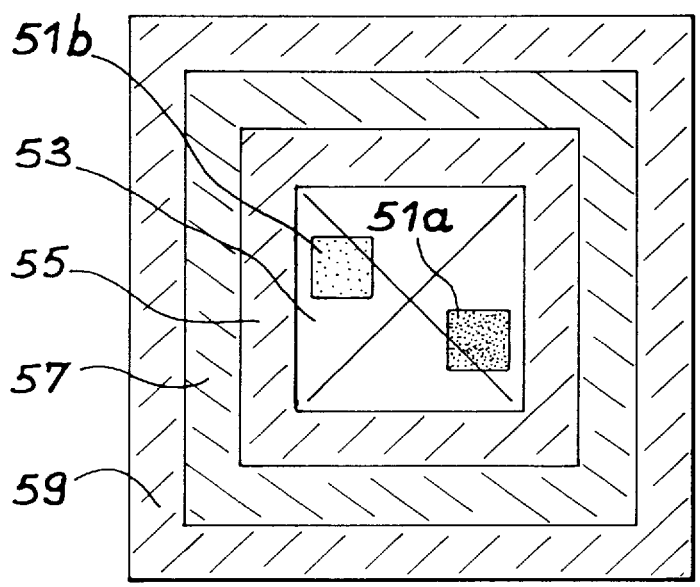

FIG. 5 illustrates another conditioning type, in which inclusion firstly takes place of the radioactive waste in a confinement matrix 53 constituted by a phosphosilicated apatite, whereby the waste can be incorporated as it is, e.g. 51a, or can already be fixed in the crystalline structure of a phosphosilicated apatite 51b. Then, around the enveloped waste in the matrix 53 can be placed several layers 55, 57, 59 of apatite having different compositions, certain of which can be natural fluoroapatite compositions Ca$_{10}$(PO$_4$)$_6$F$_2$. In this case, the innermost layer 55 can have a composition chosen so as to withstand radiation damage, whereas the outer layers 59 are chosen so as to withstand aggressions from the external medium. It is also possible to choose these different layers in such a way as to obtain a system having better mechanical properties than those of the blocks obtained in the case of FIGS. 1 to 4.

TABLE 1

| PRODUCT | y | a | b | c | d | e | f |
|---|---|---|---|---|---|---|---|
| Ca$_{10-y}$Ln$_y$(PO$_4$)$_{6-y}$ | (SiO$_4$)$_y$F$_2$ | (CaCO$_3$) | (Ln$_2$O$_3$) | (Ca$_2$P$_2$O$_7$) | (SiO$_2$) | (CaF$_2$) | (LnPO$_4$) |
| Ca$_9$Ln(PO$_4$)$_5$SiO$_4$F$_2$ | 1 | 4 | 0 | 2 | 1 | 1 | 1 |
| Ca$_8$Ln$_2$(PO$_4$)$_4$(SiO$_4$)$_2$F$_2$ | 2 | 3 | 1 | 2 | 2 | 1 | 0 |
| Ca$_8$Ln$_2$(PO$_4$)$_4$(SiO$_4$)$_2$F$_2$ | 2 | 5 | 0 | 1 | 2 | 1 | 2 |
| Ca$_6$Ln$_4$(PO$_4$)$_2$(SiO$_4$)$_4$F$_2$ | 4 | 3 | 2 | 1 | 4 | 1 | 0 |
| Ca$_6$Ln$_4$(PO$_4$)$_2$(SiO$_4$)$_4$F$_2$ | 4 | 5 | 1 | 0 | 4 | 1 | 2 |
| Ca$_5$Ln$_5$(PO$_4$)(SiO$_4$)$_5$F$_2$ | 5 | 4 | 2 | 0 | 5 | 1 | 1 |
| Ca$_4$Ln$_6$(SiO$_4$)$_6$F$_2$ | 6 | 3 | 3 | 0 | 6 | 1 | 0 |

TABLE 2

| EX | PREPARED PRODUCT | y | CaCO$_3$ (g) | La$_2$O$_3$ (g) | Ca$_2$P$_2$O (g) | SiO$_2$ (g) | CaF$_2$ (g) | Prod (g) |
|---|---|---|---|---|---|---|---|---|
| 1 | Ca$_8$La$_2$(PO$_4$)$_4$(SiO$_4$)$_2$F$_2$ | 2 | 3.00 | 3.26 | 5.08 | 1.20 | 0.86 | 12.04 |
| 2 | Ca$_6$La$_4$(PO$_4$)$_2$(SiO$_4$)$_4$F$_2$ | 4 | 3.00 | 6.52 | 2.54 | 2.40 | 0.86 | 13.96 |
| 3 | Ca$_4$La$_6$(SiO$_4$)$_6$F$_2$ | 6 | 3.00 | 9.78 | 0 | 3.60 | 0.86 | 15.88 |

We claim:

1. Process for the conditioning of radioactive waste, characterized in that it consists of incorporating said waste in a confinement matrix based on phosphosilicated apatite complying with the formula:

$$M_t Ca_x Ln_y A_z (PO_4)_u (SiO_4)_{6-u} X \quad (I)$$

in which

M is at least one alkali metal cation,

Ln represents at least one cation chosen from among yttrium and lanthanides,

A represents at least one cation chosen from among actinides,

X represents $S^{2-}$, $2F^-$, $2Cl^-$, $2OH^-$, $2Br^-$ or $2I^-$ and t, u, x, y and z are such that $0 \leq t \leq 3$
$0 < u < 6$
$0 < x < 10$
$0 \leq y \leq 10$
$y+z > 0$ and that the total number of positive charges supplied by the cations M, Ca, Ln and A is equal to (26−u).

2. Process according to claim 1, characterized in that the radioactive waste is enveloped in the phosphosilicated apatite matrix.

3. Process according to claim 1, characterized in that the radioactive waste to be conditioned is constituted by lanthanides and/or actinides and that the lanthanides and/or actinides are incorporated into the phosphosilicated apatite of formula:

$$M_t Ca_x Ln_y A_z (PO_4)_u (SiO_4)_{6-u} X \quad (I)$$

in which at least part of the Ln and A are lanthanides and actinides to be conditioned and M, x, y, t and u have the meanings given in claim 1.

4. Process according to claim 1, characterized in that the radioactive waste to be conditioned is constituted by lanthanides and/or actinides, said lanthanides and/or actinides being incorporated in the form of micro-inclusions into the phosphosilicated apatite crystals.

5. Process according to claim 2, characterized in that the radioactive waste is constituted by a phosphosilicated apatite of formula:

$$M_t Ca_x Ln_y A_z (PO_4)_u (SiO_4)_{6-u} X \quad (I)$$

in which M, Ln, A, t, x, y and u have the meanings given in claim 1, at least part of the Ln and A being constituted by radioactive actinides and/or lanthanides.

6. Process according to claim 1, characterized in that the confinement matrix comprises a phosphosilicated apatite layer and at least one other phosphosilicated or non-phosphosilicated apatite layer placed around the radioactive waste.

7. Process according to claim 1, characterized in that the phosphosilicated apatite complies with the formula:

$$Ca_{10-y} Ln_y (PO_4)_{6-y} (SiO_4)_y F_2$$

in which y is such that 0<y<6.

8. Conditioning block for a radioactive waste, characterized in that it comprises a phosphosilicated apatite matrix containing radioactive elements chosen from among actinides and/or lanthanides, the actinides and/or lanthanides entering in the chemical structure of the phosphosilicated apatite and said apatite complying with the formula:

$$M_t Ca_x Ln_y A_z (PO_4)_u (SiO_4)_{6-u} X \quad (I)$$

in which

M is at least one alkali metal cation,

Ln represents at least one cation chosen from among yttrium and lanthanides,

A represents at least one cation chosen from among actinides,

X represents $S^{2-}$, $2F^-$, $2Cl^-$, $2OH^-$, $2Br^-$ or $2I^-$ and t, u, x, y and z are such that $0 \leq t \leq 3$
$0 < u < 6$
$0 < x < 10$
$0 \leq y \leq 10$
$0 \leq z \leq 7$
$y+z > 0$ and that the total number of positive charges supplied by the cations M, Ca, Ln and A is equal to (26−u).

9. Block according to claim 8, characterized in that the phosphosilicated apatite complies with the formula:

$$M_t Ca_x Ln_y A_z (PO_4)_u (SiO_4)_{6-u} X \quad (I)$$

in which y is such that 0<y<6.

10. Process for the preparation of phosphosilicated apatite of formula:

$$M_t Ca_x Ln_y A_z (PO_4)_u (SiO_4)_{6-u} X \quad (I)$$

in which

M is at least one alkali metal cation,

Ln represents at least one cation chosen from among yttrium and lanthanides,

A represents at least one cation chosen from among actinides,

X represents $2F^-$, and t, u, x, y and z are such that $0 \leq t \leq 3$
$0 < u < 6$
$0 < x < 10$
$0 \leq y \leq 10$
$0 \leq z \leq 7$
$y+z > 0$ and that the total number of positive charges supplied by the cations M, Ca, Ln and A is such that (26−u), characterized in that it comprises the following stages:

a) preparing a mixture of powders including at least one phosphate chosen from among calcium pyrophosphate, phosphates of lanthanides and phosphates of actinides, when u is different from 0, calcium fluoride, calcium carbonate, at least one compound chosen from among $SiO_2$, $CaSiO_3$ and $M_2SiO_3$ and optionally one or more oxides chosen from among oxides of rare earths and oxides of actinides, in proportions such that they correspond to the obtaining of a desired apatite of formula (I), b) thermally treating the mixture in order to decompose the calcium carbonate and eliminate the carbon dioxide gas and c) calcining the thermally treated mixture at a temperature of 800° to 1500° C. for an appropriate time to form the phosphosilicated apatite of formula (I).

11. Process according to claim 10, characterized in that the calcination is carried out in several stages with a recrushing of the product between each stage.

12. Process according to claim 10, characterized in that calcining is carried out at a temperature of 800° to 1100° C. under a pressure of 1000 to 3000 mPa.

13. Process according to claim 5, characterized in that the confinement matrix comprises a phosphosilicated apatite layer and at least one other phosphosilicated or non-phosphosilicated apatite layer placed around the radioactive waste.

14. Process according to claim 6, characterized in that the phosphosilicated apatite complies with the formula:

$$Ca_{10-y}Ln_y(PO_4)_{6-y}(SiO_4)_yF_2$$

in which y is such that 0<y<6.

* * * * *